(12) United States Patent
Li

(10) Patent No.: US 11,627,281 B2
(45) Date of Patent: Apr. 11, 2023

(54) METHOD AND APPARATUS FOR VIDEO FRAME INTERPOLATION, AND DEVICE AND STORAGE MEDIUM

(71) Applicant: Beijing Baidu Netcom Science and Technology Co., Ltd., Beijing (CN)

(72) Inventor: Chao Li, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/406,965

(22) Filed: Aug. 19, 2021

(65) Prior Publication Data

US 2021/0385409 A1    Dec. 9, 2021

(30) Foreign Application Priority Data

Feb. 24, 2021   (CN) .......................... 202110204060.5

(51) Int. Cl.
*H04N 7/01*     (2006.01)
*G06T 7/246*    (2017.01)

(52) U.S. Cl.
CPC .......... *H04N 7/0137* (2013.01); *G06T 7/246* (2017.01); *G06T 2207/10016* (2013.01); *G06T 2207/20084* (2013.01)

(58) Field of Classification Search
CPC .. H04N 7/0137; H04N 19/172; H04N 19/587; H04N 21/4402; H04N 19/132;

(Continued)

(56) References Cited

U.S. PATENT DOCUMENTS

2020/0012940 A1*  1/2020  Liu ....................... G06N 20/10
2020/0143457 A1*  5/2020  Manmatha .......... G06F 16/7867

(Continued)

FOREIGN PATENT DOCUMENTS

CN       109922231 A      6/2019
CN       110933497 A      3/2020

(Continued)

OTHER PUBLICATIONS

European Patent Office; Extended European Search Report for Application No. 21191965.9, dated Jan. 12, 2022 (10 pages).

(Continued)

*Primary Examiner* — Michael Lee
(74) *Attorney, Agent, or Firm* — Nixon Peabody LLP

(57) ABSTRACT

A method and apparatus for video frame interpolation, and a device and a storage medium for the same are provided. The method may include: acquiring a target video, and acquiring a $(t-1)^{th}$ frame of image and a $t^{th}$ frame of image in the target video; acquiring motion level information of pixel points of the $(t-1)^{th}$ frame of image and the $t^{th}$ frame of image; acquiring deep frame interpolation features of the $(t-1)^{th}$ frame of image and the $t^{th}$ frame of image, respectively; and performing a frame interpolation operation layer by layer based on the deep frame interpolation features and the motion level information of the $(t-1)^{th}$ frame of image and the $t^{th}$ frame of image to generate an intermediate frame between the $(t-1)^{th}$ frame of image and the $t^{th}$ frame of image, and interpolating the intermediate frame between the $(t-1)^{th}$ frame of image and the $t^{th}$ frame of image.

15 Claims, 4 Drawing Sheets

(58) Field of Classification Search
CPC ......... H04N 21/2187; H04N 21/23418; H04N 21/23424; H04N 21/44008; H04N 21/44016; H04N 21/4788; G06T 7/246; G06T 2207/10016; G06T 2207/20084; G06T 3/4046; G06N 3/0454; G06N 3/08
See application file for complete search history.

(56) References Cited

U.S. PATENT DOCUMENTS

| | | | |
|---|---|---|---|
| 2020/0394752 A1* | 12/2020 | Liu | G06N 5/046 |
| 2021/0329195 A1* | 10/2021 | Li | H04N 7/0137 |
| 2021/0360252 A1 | 11/2021 | Li et al. | |
| 2021/0383169 A1* | 12/2021 | Wang | G06T 7/207 |
| 2022/0092795 A1* | 3/2022 | Liu | G06N 3/084 |
| 2022/0103782 A1* | 3/2022 | Li | G06T 7/246 |

FOREIGN PATENT DOCUMENTS

| | | |
|---|---|---|
| CN | 111654746 A | 9/2020 |
| CN | 112055249 A | 12/2020 |

OTHER PUBLICATIONS

Liu Jiaying et al.; "Deep Reference Generation with Multi-Domain Hierarchical Constraints for Inter Prediction"; IEEE Transactions on Multimedia, IEEE, USA; vol. 22, No. 10, pp. 2497-2510; Dec. 23, 2019; XP011810191; ISSN: 1520-9210, DOI: 10.1109/TMM.2019.2961504 (14 pages).

Jinsoo Choi et al.; "DIFRINT: Deep Iterative Frame Interpolation for Full-Frame Video Stabilization"; 2019 IEEE/CVF International Conference on Computer Vision Workshop (ICCVW), IEEE, USA; Oct. 27, 2019; pp. 3732-3736; XP033732730; DOI: 10.1109/ICCVW.2019.00463 (5 pages).

* cited by examiner

METHOD AND APPARATUS FOR VIDEO FRAME INTERPOLATION, AND DEVICE AND STORAGE MEDIUM

CROSS-REFERENCE TO RELATED APPLICATIONS

This application claims the priority of Chinese Patent Application No. 202110204060.5 titled "METHOD AND APPARATUS FOR VIDEO FRAME INTERPOLATION, AND DEVICE AND STORAGE MEDIUM", filed on Feb. 24, 2021, the content of which is incorporated herein by reference in its entirety.

TECHNICAL FIELD

Embodiments of the present disclosure relate to the field of computer, specifically to the field of artificial intelligence such as computer vision and deep learning, and particularly to a method and apparatus for video frame interpolation, and a device and a storage medium for the same.

BACKGROUND

With the rise of live streaming businesses, the costs of bandwidth distribution of servers become the main costs of live streaming business providers. In order to reduce bandwidth costs, one of the most direct approaches is to distribute low frame rate videos. However, the viewing experiences with low frame rate videos are quite different from those with high frame rate videos of 60 FPS (Frames Per Second) or 120 FPS.

SUMMARY

Embodiments of the present disclosure provide a method and apparatus for video frame interpolation, and a device and a storage medium for the same.

In a first aspect, an embodiment of the present disclosure provides a method for video frame interpolation, and the method includes: acquiring a target video, and acquiring a $(t-1)^{th}$ frame of image and a $t^{th}$ frame of image in the target video, t being a positive integer; acquiring motion level information of pixel points of the $(t-1)^{th}$ frame of image and the $t^{th}$ frame of image; acquiring a deep frame interpolation feature of the $(t-1)^{th}$ frame of image and a deep frame interpolation feature of the $t^{th}$ frame of image, respectively; and performing a frame interpolation operation layer by layer based on the deep frame interpolation features and the motion level information of the $(t-1)^{th}$ frame of image and the $t^{th}$ frame of image to generate an intermediate frame between the $(t-1)^{th}$ frame of image and the $t^{th}$ frame of image, and interpolating the intermediate frame between the $(t-1)^{th}$ frame of image and the $t^{th}$ frame of image.

In a second aspect, an embodiment of the present disclosure provides an apparatus for video frame interpolation, and the apparatus includes: a first acquiring module configured to acquire a target video, and acquire a $(t-1)^{th}$ frame of image and a $t^{th}$ frame of image in the target video, t being a positive integer; a second acquiring module configured to acquire motion level information of pixel points of the $(t-1)^{th}$ frame of image and the $t^{th}$ frame of image; a third acquiring module configured to acquire a deep frame interpolation feature of the $(t-1)^{th}$ frame of image and a deep frame interpolation feature of the $t^{th}$ frame of image, respectively; and a frame interpolating module configured to perform a frame interpolation operation layer by layer based on the deep frame interpolation features and the motion level information of the $(t-1)^{th}$ frame of image and the $t^{th}$ frame of image to generate an intermediate frame between the $(t-1)^{th}$ frame of image and the $t^{th}$ frame of image, and interpolate the intermediate frame between the $(t-1)^{th}$ frame of image and the $t^{th}$ frame of image.

In a third aspect, an embodiment of the present disclosure provides an electronic device including: at least one processor; and a storage device communicated with the at least one processor, where the storage device stores instructions executable by the at least one processor, and the instructions are executed by the at least one processor, to enable the at least one processor to perform the method as described in any one of the implementations of the first aspect.

In a fourth aspect, an embodiment of the present disclosure provides a non-transitory computer readable storage medium storing computer instructions, where the computer instructions are used to enable a computer to perform the method as described in any one of the implementations of the first aspect.

In a fifth aspect, an embodiment of the present disclosure provides a computer program product including a computer program, where the computer program, when executed by a processor, implements the method as described in any one of the implementations of the first aspect.

According to the method and apparatus for video frame interpolation, the device and the storage medium that are provided in the embodiments of the present disclosure, the target video and the $(t-1)^{th}$ frame of image and the $t^{th}$ frame of image in the target video are first acquired. Here, t is the positive integer. Then, the motion level information of the pixel points of the $(t-1)^{th}$ frame of image and the $t^{th}$ frame of image is acquired. Next, the deep frame interpolation feature of the $(t-1)^{th}$ frame of image and the deep frame interpolation feature of the $t^{th}$ frame of image are respectively acquired. Finally, the frame interpolation operation is performed layer by layer based on the deep frame interpolation features and the motion level information of the $(t-1)^{th}$ frame of image and the $t^{th}$ frame of image, to generate the intermediate frame between the $(t-1)^{th}$ frame of image and the $t^{th}$ frame of image, and the intermediate frame is interpolated between the $(t-1)^{th}$ frame of image and the $t^{th}$ frame of image. The present disclosure provides a method for video frame interpolation based on a layered perception technology.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

In combination of detailed descriptions of non-limiting embodiments given with reference to the following accompanying drawings, other features, objectives and advantages of the present disclosure will be more apparent. The accompanying drawings are used for a better understanding of the scheme, and do not constitute a limitation to the present disclosure.

DETAILED DESCRIPTION OF EMBODIMENTS

Example embodiments of the present disclosure are described below in combination with the accompanying drawings, and various details of the embodiments of the present disclosure are included in the description to facilitate understanding, and should be considered as examples only. Accordingly, it should be recognized by one of ordinary skill in the art that various changes and modifications may be made to the embodiments described herein without departing from the scope and spirit of the present disclosure. Also, for clarity and conciseness, descriptions of well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
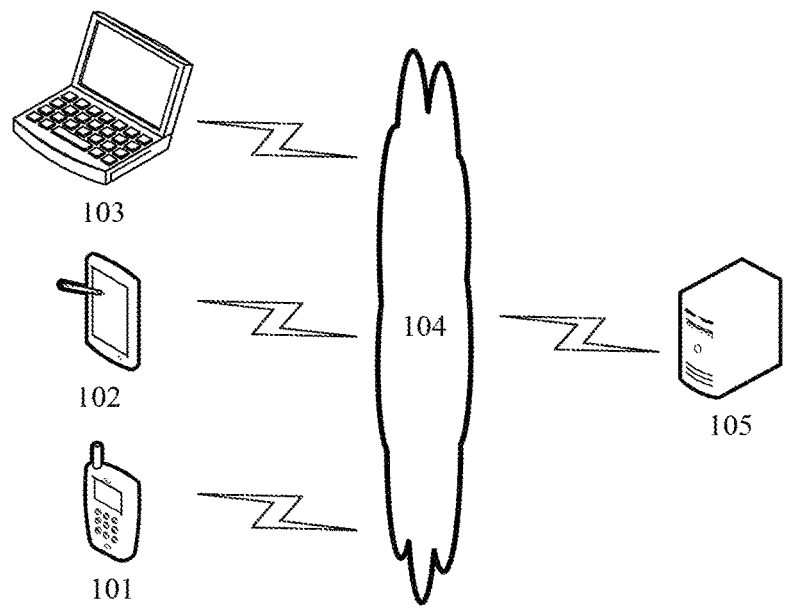
FIG. 1 is a diagram of an example system architecture diagram to which the present disclosure may be applied.

FIG. 1 illustrates an example system architecture 100 to which an embodiment of a method for video frame interpolation or an apparatus for video frame interpolation according to the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may use the terminal devices 101, 102 and 103 to interact with the server 105 via the network 104, to receive or send a video frame, etc. Various client applications (e.g., video software) may be installed on the terminal devices 101, 102 and 103.

The terminal devices 101, 102 and 103 may be hardware or software. When being the hardware, the terminal devices 101, 102 and 103 may be various electronic devices, the electronic devices including, but not limited to, a smart phone, a tablet computer, a laptop portable computer, a desktop computer, and the like. When being the software, the terminal devices 101, 102 and 103 may be installed in the above listed electronic devices, and the terminal devices may be implemented as a plurality of pieces of software or a plurality of software modules, or may be implemented as a single piece of software or a single software module, which will not be specifically limited herein.

The server 105 may provide various services. For example, the server 105 may analyze and process a video acquired from the terminal devices 101, 102 and 103, and generate a processing result (e.g., an intermediate frame).

It should be noted that the server 105 may be hardware or software. When being the hardware, the server 105 may be implemented as a distributed server cluster composed of a plurality of servers, or may be implemented as a single server. When being the software, the server 105 may be implemented as a plurality of pieces of software or a plurality of software modules (e.g., software or software modules for providing a distributed service), or may be implemented as a single piece of software or a single software module, which will not be specifically limited herein.

It should be noted that the method for video frame interpolation provided in the embodiments of the present disclosure is generally performed by the server 105. Correspondingly, the apparatus for video frame interpolation is generally provided in the server 105.

It should be appreciated that the numbers of the terminal devices, the network, and the server in FIG. 1 are merely illustrative. Any number of terminal devices, networks, and servers may be provided based on actual requirements.

Figure 2:
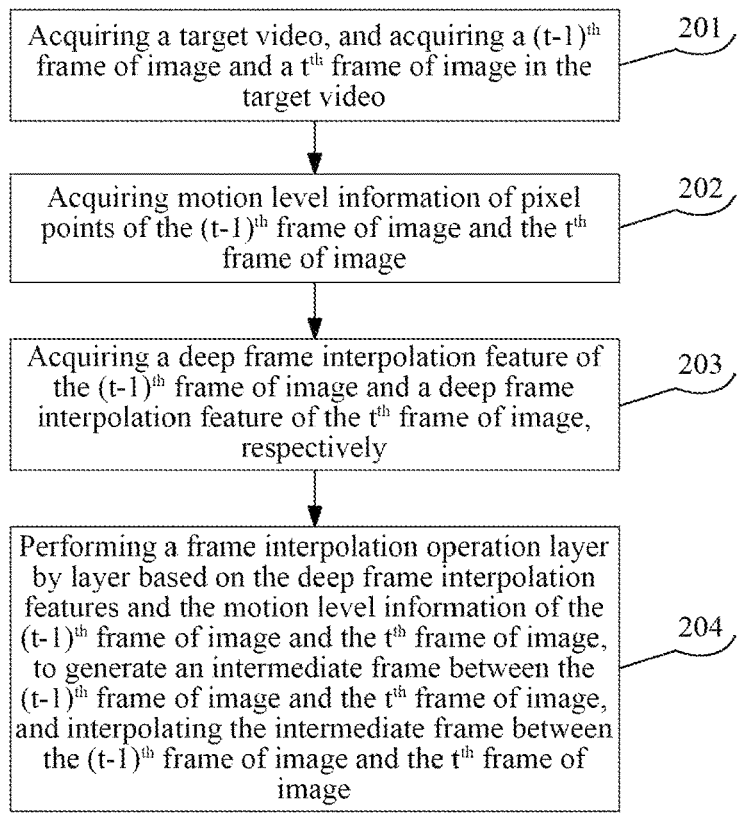
FIG. 2 is a flowchart of an embodiment of a method for video frame interpolation according to the present disclosure.

Further referring to FIG. 2, FIG. 2 illustrates a flow 200 of an embodiment of a method for video frame interpolation according to the present disclosure. The method for video frame interpolation includes the following steps 201 to 204.

Step 201 includes acquiring a target video, and acquiring a $(t-1)^{th}$ frame of image and a $t^{th}$ frame of image in the target video.

In this embodiment, an executing body (e.g., the server 105 shown in FIG. 1) of the method for video frame interpolation may acquire the target video, and the target video may be a target video on which a user wants to perform a video frame interpolation to improve the smoothness of the playback of the target video and/or solve a problem of the target video such as image distortion and image blurring. After acquiring the target video, the executing body further acquires the $(t-1)^{th}$ frame of image and the $t^{th}$ frame of image in the target video. Here, t is a positive integer. The $(t-1)^{th}$ frame of image and the $t^{th}$ frame of image are any two adjacent frames of images in the target video. The target video may include a plurality of frames of images, that is, a plurality of single-frame images. After acquiring the target video, the executing body may acquire any two adjacent frames of images (i.e., the $(t-1)^{th}$ frame of image and the $t^{th}$ frame of image) in the target video by executing a preset application program.

Step 202 includes acquiring motion level information of pixel points of the $(t-1)^{th}$ frame of image and the $t^{th}$ frame of image.

In this embodiment, the executing body may acquire the motion level information of the pixel points of the $(t-1)^{th}$ frame of image and the $t^{th}$ frame of image, and the motion level information represents motion levels of the pixel points in the $(t-1)^{th}$ frame of image and the $t^{th}$ frame of image. Specifically, the executing body may input the $(t-1)^{th}$ frame of image and the $t^{th}$ frame of image into a pre-trained deep neural network to obtain a motion level deep feature of the $(t-1)^{th}$ frame of image and a motion level deep feature of the $t^{th}$ frame of image, and classify the pixel points of the $(t-1)^{th}$ frame of image and the $t^{th}$ frame of image into different levels based on the motion level deep features. The different levels may refer to a motion layer or a stationary layer. Here, there may be a plurality of motion layers, such as a first motion layer and a second motion layer. Here, the deep neural network may be a deep neural network trained in advance using deep feature data, to which no limitation will be made herein. Specifically, pixels having identical motion attributes, objects having identical motion attributes or areas having identical motion attributes are marked as a given level. As an example, if there are three vehicles moving eastward and two pedestrians moving southward in image 1, the three vehicles moving eastward may be marked as a given level (denoted by Level 1), and the two pedestrians moving southward may be marked as a given level (denoted by Level 2). As another example, if there are three vehicles in image 2 one of which moves southward and other two of which move northward, the vehicle moving southward may be marked as Level 3, and the other two vehicles moving northward may be marked as Level 4. In this embodiment, the pixels having the identical motion attributes, the objects having the identical motion attributes or the areas having the identical motion attributes are divided into the given level, thus obtaining the motion levels of the pixel points of the $(t-1)^{th}$ frame of image and the $t^{th}$ frame of image.

Step 203 includes acquiring a deep frame interpolation feature of the $(t-1)^{th}$ frame of image and a deep frame interpolation feature of the $t^{th}$ frame of image, respectively.

In this embodiment, the executing body may respectively acquire the deep frame interpolation feature of the $(t-1)^{th}$ frame of image and the deep frame interpolation feature of the $t^{th}$ frame of image. A deep frame interpolation feature refers to a feature that may be used to perform a frame interpolation operation. Specifically, the executing body may input the $(t-1)^{th}$ frame of image and the $t^{th}$ frame of image into a pre-trained deep frame interpolation neural network to obtain the deep frame interpolation features of the $(t-1)^{th}$ frame of image and the $t^{th}$ frame of image. Here, the deep frame interpolation neural network may be a deep frame interpolation neural network trained in advance using deep frame interpolation feature data, to which no limitation will be made herein.

Step 204 includes performing a frame interpolation operation layer by layer based on the deep frame interpolation features and the motion level information of the $(t-1)^{th}$ frame of image and the $t^{th}$ frame of image, to generate an intermediate frame between the $(t-1)^{th}$ frame of image and the $t^{th}$ frame of image, and interpolating the intermediate frame between the $(t-1)^{th}$ frame of image and the $t^{th}$ frame of image.

In this embodiment, the executing body may perform the frame interpolation operation layer by layer based on the deep frame interpolation features of the $(t-1)^{th}$ frame of image and the $t^{th}$ frame of image that are obtained in step 203 and the motion level information of the pixel points of the $(t-1)^{th}$ frame of image and the $t^{th}$ frame of image that is obtained in step 202, thereby generating the intermediate frame between the $(t-1)^{th}$ frame of image and the $t^{th}$ frame of image. The executing body may interpolate the intermediate frame between the $(t-1)^{th}$ frame of image and the $t^{th}$ frame of image. Since the motion level information of the pixel points of the $(t-1)^{th}$ frame of image and the $t^{th}$ frame of image is already obtained in step 202, the frame interpolation operation may be performed layer by layer based on the motion level information of the pixel points of the $(t-1)^{th}$ frame of image and the $t^{th}$ frame of image and the deep frame interpolation features, thereby generating the intermediate frame. Specifically, the deep frame interpolation features and the motion level information of the $(t-1)^{th}$ frame of image and the $t^{th}$ frame of image may be inputted into a pre-trained frame interpolation model, and the frame interpolation model may perform a frame interpolation operation layer by layer based on the motion level information, thus obtaining intermediate frames of layers. The obtained intermediate frames of the layers are combined to obtain the intermediate frame between the $(t-1)^{th}$ frame of image and the $t^{th}$ frame of image, and the intermediate frame is interpolated between the $(t-1)^{th}$ frame of image and the $t^{th}$ frame of image. Here, the frame interpolation model may be a deep convolutional neural network model trained in advance and used for a frame interpolation operation, to which no limitation will be made herein.

According to the method for video frame interpolation provided in the embodiment of the present disclosure, the target video and the $(t-1)^{th}$ frame of image and the $t^{th}$ frame of image in the target video are first acquired. Here, t is the positive integer. Then, the motion level information of the pixel points of the $(t-1)^{th}$ frame of image and the $t^{th}$ frame of image is acquired. Next, the deep frame interpolation feature of the $(t-1)^{th}$ frame of image and the deep frame interpolation feature of the $t^{th}$ frame of image are respectively acquired. Finally, the frame interpolation operation is performed layer by layer based on the deep frame interpolation features and the motion level information of the $(t-1)^{th}$ frame of image and the $t^{th}$ frame of image, to generate the intermediate frame between the $(t-1)^{th}$ frame of image and the $t^{th}$ frame of image, and the intermediate frame is interpolated between the $(t-1)^{th}$ frame of image and the $t^{th}$ frame of image. The present disclosure provides a method for video frame interpolation based on a layered perception technology. A video frame is divided into different motion levels, and pixels having similar motion modes are classified into the given level. Accordingly, the difficulty to learn the optical flow is reduced, which makes the optical flow estimation at each level more accurate. The optical flows of the different levels are separated without affecting each other while being mapped, thus alleviating a problem such as image distortion. Moreover, a static floating layer such as a subtitle layer or a logo (logotype) layer is not interfered by other optical flow information, thereby solving a problem such as image jitter.

Figure 3:
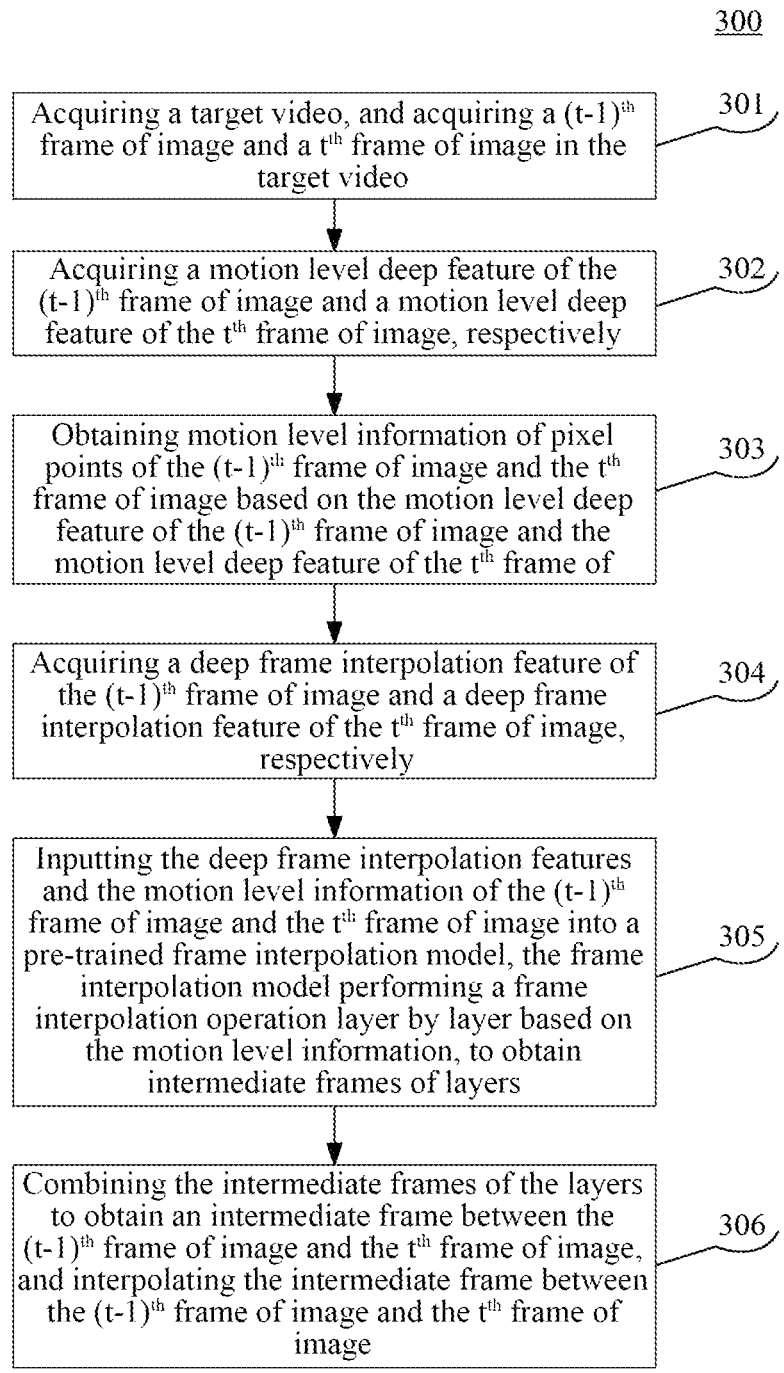
FIG. 3 is a flowchart of another embodiment of the method for video frame interpolation according to the present disclosure.

Further referring to FIG. 3 that illustrates a flow 300 of another embodiment of the method for video frame interpolation according to the present disclosure, the method for video frame interpolation includes the following steps 301 to 306.

Step 301 includes acquiring a target video, and acquiring a $(t-1)^{th}$ frame of image and a $t^{th}$ frame of image in the target video, t being a positive integer.

In this embodiment, an executing body (e.g., the server 105 shown in FIG. 1) of the method for video frame interpolation may acquire the target video and acquire the $(t-1)^{th}$ frame of image and the $t^{th}$ frame of image in the target video. Here, t is the positive integer. Step 301 corresponds to step 201 in the foregoing embodiment. A specific implementation of step 301 may be described with reference to the above description of step 201, and will not be repeatedly described herein.

Step 302 includes acquiring a motion level deep feature of the $(t-1)^{th}$ frame of image and a motion level deep feature of the $t^{th}$ frame of image, respectively.

In this embodiment, the above executing body may acquire the motion level deep feature of the $(t-1)^{th}$ frame of image and the motion level deep feature of the $t^{th}$ frame of image. Specifically, the $(t-1)^{th}$ frame of image and the $t^{th}$ frame of image may be inputted into a pre-trained deep neural network to obtain the motion level deep feature of the $(t-1)^{th}$ frame of image and the motion level deep feature of the $t^{th}$ frame of image. Motion level deep features are used to distinguish motion levels of pixel points.

Step 303 includes obtaining motion level information of pixel points of the $(t-1)^{th}$ frame of image and the $t^{th}$ frame of image based on the motion level deep feature of the $(t-1)^{th}$ frame of image and the motion level deep feature of the $t^{th}$ frame of image.

In this embodiment, the above executing body may obtain the motion level information of the pixel points of the $(t-1)^{th}$ frame of image and the $t^{th}$ frame of image based on the motion level deep feature of the $(t-1)^{th}$ frame of image and the motion level deep feature of the $t^{th}$ frame of image that are acquired in step 302.

In some alternative implementations of this embodiment, the executing body marks pixels having identical motion attributes, objects having identical motion attributes or areas having identical motion attributes as a given level based on the motion level deep feature of the $(t-1)^{th}$ frame of image and the motion level deep feature of the $t^{th}$ frame of image, to obtain the motion level information of the pixel points of the $(t-1)^{th}$ frame of image and the $t^{th}$ frame of image. By dividing the pixels in a video frame image into different levels, the optical flows of the different levels are separated without affecting each other while being mapped.

In some alternative implementations of this embodiment, motion levels include a motion layer and a stationary layer. Here, there may be a plurality of motion layers.

Step 304 includes acquiring a deep frame interpolation feature of the $(t-1)^{th}$ frame of image and a deep frame interpolation feature of the $t^{th}$ frame of image, respectively.

In this embodiment, the executing body may respectively acquire the deep frame interpolation feature of the $(t-1)^{th}$ frame of image and the deep frame interpolation feature of the $t^{th}$ frame of image. Step 304 corresponds to step 203 in the foregoing embodiment. A specific implementation of step 304 may be made with reference to the above description of step 201, and will not be repeatedly described herein.

Step 305 includes inputting the deep frame interpolation features and the motion level information of the $(t-1)^{th}$ frame of image and the $t^{th}$ frame of image into a pre-trained frame interpolation model, the frame interpolation model performing a frame interpolation operation layer by layer based on the motion level information, to obtain intermediate frames of layers.

In this embodiment, the executing body may input the deep frame interpolation features of the $(t-1)^{th}$ frame of image and the $t^{th}$ frame of image that are acquired in step 304 and the motion level information of the $(t-1)^{th}$ frame of image and the $t^{th}$ frame of image that is obtained in step 303 into the pre-trained frame interpolation model. The frame interpolation model performs the frame interpolation operation layer by layer based on the motion level information, thus obtaining the intermediate frames of the layers. Since the pre-trained frame interpolation model itself is composed of a deep convolutional neural network, the model does not involve a complex computation such as a traditional optical flow estimation and a motion compensation, thus having a high computation efficiency. Moreover, the frame interpolation operation is performed layer by layer to generate the intermediate frames corresponding to the motion levels of the layers, which can make the optical flow estimation at each level more accurate.

In some alternative implementations of this embodiment, frame interpolation operations for layers are identical.

Step 306 includes combining the intermediate frames of the layers to obtain an intermediate frame between the $(t-1)^{th}$ frame of image and the $t^{th}$ frame of image, and interpolating the intermediate frame between the $(t-1)^{th}$ frame of image and the $t^{th}$ frame of image.

In this embodiment, the executing body may combine the intermediate frames of the layers that are obtained in step 305, to generate the intermediate frame between the $(t-1)^{th}$ frame of image and the $t^{th}$ frame of image, and may interpolate the intermediate frame between the $(t-1)^{th}$ frame of image and the $t^{th}$ frame of image.

According to the method for video frame interpolation provided in the embodiment of the present disclosure, the target video and the $(t-1)^{th}$ frame of image and the $t^{th}$ frame of image in the target video are first acquired. Then, the motion level deep feature of the $(t-1)^{th}$ frame of image and the motion level deep feature of the $t^{th}$ frame of image are respectively acquired. Next, the motion level information of the pixel points of the $(t-1)^{th}$ frame of image and the $t^{th}$ frame of image is obtained based on the motion level deep feature of the $(t-1)^{th}$ frame of image and the motion level deep feature of the $t^{th}$ frame of image. Then, the deep frame interpolation feature of the $(t-1)^{th}$ frame of image and the deep frame interpolation feature of the $t^{th}$ frame of image are respectively acquired. Moreover, the deep frame interpolation features and the motion level information of the $(t-1)^{th}$ frame of image and the $t^{th}$ frame of image are inputted into the pre-trained frame interpolation model, and the frame interpolation model performs the frame interpolation operation layer by layer based on the motion level information, to obtain the intermediate frames of the layers. Finally, the intermediate frames of the layers are combined to obtain the intermediate frame between the $(t-1)^{th}$ frame of image and the $t^{th}$ frame of image, and the intermediate frame is interpolated between the $(t-1)^{th}$ frame of image and the $t^{th}$ frame of image. According to the method for video frame interpolation provided in the embodiment of the present disclosure, a video frame is divided into different motion levels, and pixels having similar motion modes are classified into the given level. Accordingly, the difficulty to learn the optical flow is reduced, which makes the optical flow estimation at each level more accurate. The optical flows of the different levels are separated without affecting each other while being mapped, thus alleviating a problem such as image distortion. Moreover, a static floating layer such as a subtitle layer or a logo layer is not interfered by other optical flow information, thereby solving a problem such as image jitter.

Figure 4:
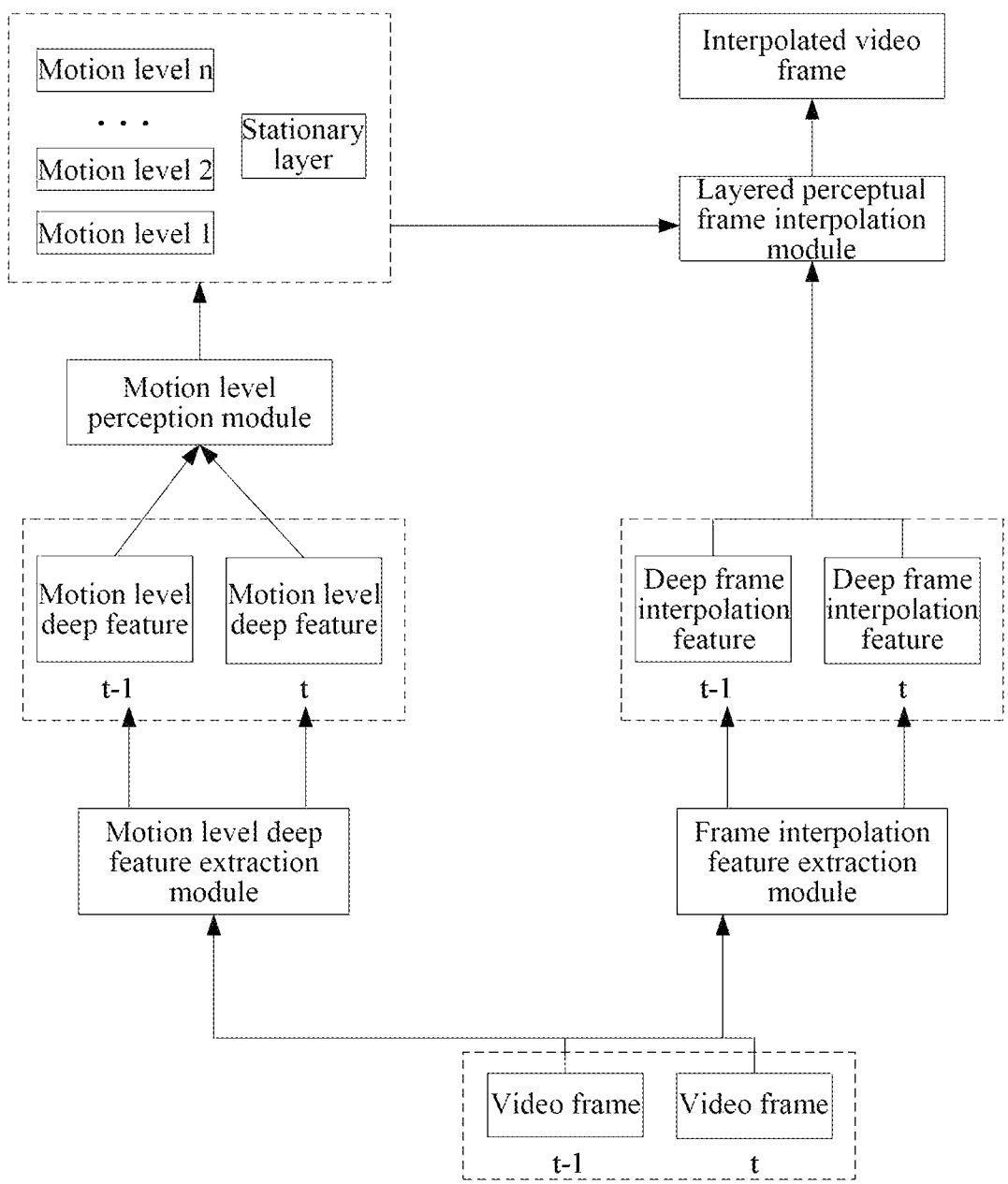
FIG. 4 is a block diagram of an implementation of the method for video frame interpolation.

Further referring to FIG. 4, FIG. 4 is a block diagram of an implementation of the method for video frame interpolation. As shown in FIG. 4, two adjacent frames of images (i.e., a $(t-1)^{th}$ frame of image and a $t^{th}$ frame of image) in a target video are first extracted. Then, a motion level deep feature extraction module extracts a motion level deep feature of the $(t-1)^{th}$ frame of image and a motion level deep feature of the $t^{th}$ frame of image, respectively, and inputs the extracted motion level deep features of the $(t-1)^{th}$ frame of image and the $t^{th}$ frame of image into a motion level perception module. The motion level perception module divides pixel points into different motion levels based on the motion level deep features, and the motion levels include a plurality of motion layers and one stationary layer, such as motion level 1, motion level 2 . . . motion level n and the stationary layer. Next, a frame interpolation feature extraction module extracts a deep frame interpolation feature of the $(t-1)^{th}$ frame of image and a deep frame interpolation feature of the $t^{th}$ frame of image, respectively. Then, the deep frame interpolation features of the $(t-1)^{th}$ frame of image and the $t^{th}$ frame of image and the motion level information of the pixel points of the $(t-1)^{th}$ frame of image and the $t^{th}$ frame of image are inputted into a layered perceptual frame interpolation module. The layered perceptual frame interpolation module performs the frame interpolation operation layer by layer to generate the intermediate frames of the layers, combines the intermediate frames of the layers to obtain a final combined intermediate video frame between the $(t-1)^{th}$ frame of image and the $t^{th}$ frame of image, and interpolates the final combined intermediate frame between the $(t-1)^{th}$ frame of image and the $t^{th}$ frame of image.

Figure 5:
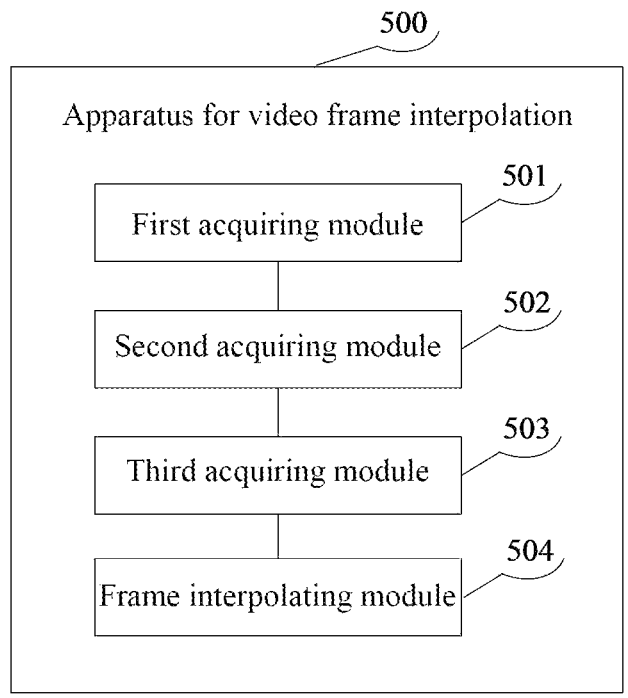
FIG. 5 is a schematic structural diagram of an embodiment of an apparatus for video frame interpolation according to the present disclosure.

Further referring to FIG. 5, as an implementation of the method shown in the above drawings, the present disclosure provides an embodiment of an apparatus for video frame interpolation. The embodiment of the apparatus corresponds to the embodiment of the method shown in FIG. 2, and the apparatus may be applied to various electronic devices.

As shown in FIG. 5, the apparatus 500 for video frame interpolation in this embodiment may include: a first acquiring module 501, a second acquiring module 502, a third acquiring module 503 and a frame interpolating module 504. Here, the first acquiring module 501 is configured to acquire a target video, and acquire a $(t-1)^{th}$ frame of image and a $t^{th}$ frame of image in the target video, t being a positive integer. The second acquiring module 502 is configured to acquire motion level information of pixel points of the $(t-1)^{th}$ frame of image and the $t^{th}$ frame of image. The third acquiring module 503 is configured to acquire a deep frame interpolation feature of the $(t-1)^{th}$ frame of image and a deep frame interpolation feature of the $t^{th}$ frame of image, respectively. The frame interpolating module 504 is configured to perform a frame interpolation operation layer by layer based on the deep frame interpolation features and the motion level information of the $(t-1)^{th}$ frame of image and the $t^{th}$ frame of image to generate an intermediate frame between the $(t-1)^{th}$ frame of image and the $t^{th}$ frame of image, and interpolate the intermediate frame between the $(t-1)^{th}$ frame of image and the $t^{th}$ frame of image.

In this embodiment, specific processes of the first acquiring module 501, the second acquiring module 502, the third acquiring module 503 and the frame interpolating module 504 of the apparatus 500 for video frame interpolation, and their technical effects may be respectively described with reference to relevant descriptions of steps 201-204 in the corresponding embodiment of FIG. 2, and will not be repeatedly described herein.

In some alternative implementations of this embodiment, the second acquiring module further includes: an acquiring sub-module, configured to acquire a motion level deep feature of the $(t-1)^{th}$ frame of image and a motion level deep feature of the $t^{th}$ frame of image, respectively; and a motion level sub-module, configured to obtain the motion level information of the pixel points of the $(t-1)^{th}$ frame of image and the $t^{th}$ frame of image based on the motion level deep feature of the $(t-1)^{th}$ frame of image and the motion level deep feature of the $t^{th}$ frame of image.

In some alternative implementations of this embodiment, the motion level sub-module is further configured to: mark pixels having identical motion attributes, objects having identical motion attributes or areas having identical motion attributes as a given level based on the motion level deep feature of the $(t-1)^{th}$ frame of image and the motion level deep feature of the $t^{th}$ frame of image, to obtain the motion level information of the pixel points of the $(t-1)^{th}$ frame of image and the $t^{th}$ frame of image.

In some alternative implementations of this embodiment, the motion levels include a motion layer and a stationary layer.

In some alternative implementations of this embodiment, the frame interpolating module is further configured to: input the deep frame interpolation features and the motion level information of the $(t-1)^{th}$ frame of image and the $t^{th}$ frame of image into a pre-trained frame interpolation model, the frame interpolation model performing the frame interpolation operation layer by layer based on the motion level information, to obtain intermediate frames of layers; and combine the intermediate frames of the layers to obtain the intermediate frame between the $(t-1)^{th}$ frame of image and the $t^{th}$ frame of image, and interpolate the intermediate frame between the $(t-1)^{th}$ frame of image and the $t^{th}$ frame of image.

In some alternative implementations of this embodiment, frame interpolation operations for layers are identical.

According to an embodiment of the present disclosure, the present disclosure further provides an electronic device, a readable storage medium, and a computer program product.

Figure 6:
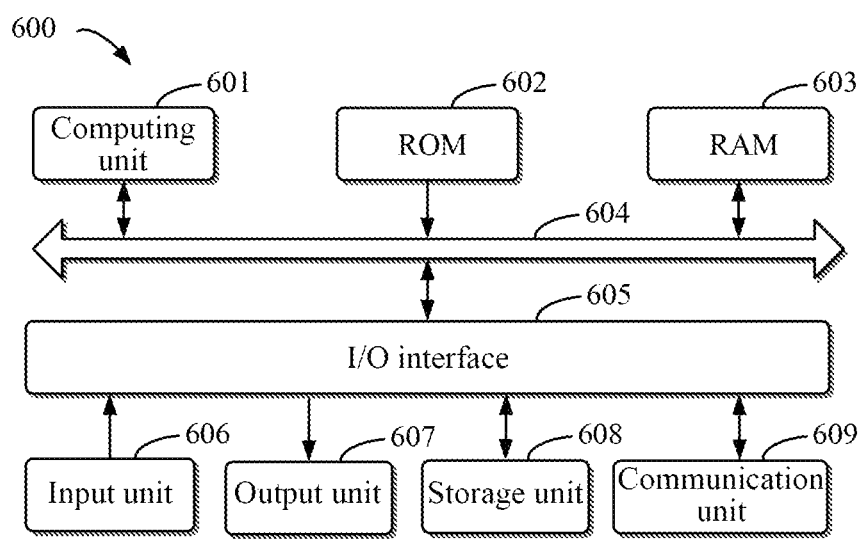
FIG. 6 is a block diagram of an electronic device used to implement a method for video frame interpolation according to embodiments of the present disclosure.

FIG. 6 is a schematic block diagram of an exemplary electronic device 600 that may be used to implement embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 6, the electronic device 600 includes a computation unit 601, which may execute various appropriate actions and processes in accordance with a computer program stored in a read-only memory (ROM) 602 or a computer program loaded into a random access memory (RAM) 603 from a storage unit 608. The RAM 603 alternatively stores various programs and data required by operations of the device 600. The computation unit 601, the ROM 602 and the RAM 603 are connected to each other through a bus 604. An input/output (I/O) interface 605 is also connected to the bus 604.

Multiple components of the device 600 are connected to the I/O interface 605, and include: an input unit 606, such as a keyboard and a mouse; an output unit 607, such as various types of displays and a speaker; a storage unit 608, such as a magnetic disk and an optical disk; and a communication unit 609, such as a network card, a modem and a wireless communication transceiver. The communication unit 609 allows the device 600 to exchange information or data with other devices through a computer network, such as the Internet and/or various telecommunications networks.

The computing unit 601 may be various general-purpose and/or specific-purpose processing components having processing and computing capabilities. Some examples of the computing unit 601 include, but are not limited to, a central processing unit (CPU), a graphics processing unit (GPU), various specific artificial intelligence (AI) computing chips, various computing units running machine learning model algorithms, a digital signal processor (DSP), and any appropriate processor, controller, microcontroller and the like. The computing unit 601 performs various methods and processing described above, such as the method for video frame interpolation. For example, in some embodiments, the method for video frame interpolation may be implemented as a computer software program, which is tangibly included in a machine-readable medium, such as the storage unit 608. In some embodiments, part or all of the computer program may be loaded and/or installed on the device 600 through the ROM 602 and/or the communication unit 609. When the computer program is loaded into the RAM 603 and executed by the computing unit 601, one or more steps of the method for video frame interpolation described above may be performed. Alternatively, in other embodiments, the computing unit 601 may be configured to perform the method for video frame interpolation in any other appropriate manner (such as through firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input device and at least one output device, and send the data and instructions to the storage system, the at least one input device and the at least one output device.

Program codes used to implement the method of the present disclosure may be written in any combination of one or more programming languages. These program codes may be provided to a processor or controller of a general-purpose computer, specific-purpose computer or other programmable data processing apparatus, so that the program codes, when executed by the processor or controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more specific example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other.

It should be appreciated that the steps of reordering, adding or deleting may be executed using the various forms described above. For example, the steps described in the present disclosure may be executed in parallel or sequentially or in a different order, so long as the expected results of the technical solutions provided in the present disclosure may be realized, and no limitation is imposed herein.

The above specific implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for video frame interpolation, comprising:
acquiring a target video, and acquiring a $(t-1)^{th}$ frame of image and a $t^{th}$ frame of image in the target video, t being a positive integer;
acquiring motion level information of pixel points of the $(t-1)^{th}$ frame of image and the $t^{th}$ frame of image;
acquiring a deep frame interpolation feature of the $(t-1)^{th}$ frame of image and a deep frame interpolation feature of the $t^{th}$ frame of image, respectively; and
performing a frame interpolation operation layer by layer based on the deep frame interpolation features and the motion level information of the $(t-1)^{th}$ frame of image and the $t^{th}$ frame of image to generate an intermediate frame between the $(t-1)^{th}$ frame of image and the $t^{th}$ frame of image, and interpolating the intermediate frame between the $(t-1)^{th}$ frame of image and the $t^{th}$ frame of image,
wherein the acquiring motion level information of pixel points of the $(t-1)^{th}$ frame of image and the $t^{th}$ frame of image comprises:
acquiring a motion level deep feature of the $(t-1)^{th}$ frame of image and a motion level deep feature of the $t^{th}$ frame of image, respectively; and obtaining the motion level information of the pixel points of the $(t-1)^{th}$ frame of image and the $t^{th}$ frame of image based on the motion level deep feature of the $(t-1)^{th}$ frame of image and the motion level deep feature of the $t^{th}$ frame of image.

2. The method according to claim 1, wherein the obtaining the motion level information of the pixel points of the $(t-1)^{th}$ frame of image and the $t^{th}$ frame of image based on the motion level deep feature of the $(t-1)^t$ frame of image and the motion level deep feature of the $t^{th}$ frame of image comprises:

marking pixels having identical motion attributes, objects having identical motion attributes or areas having identical motion attributes as a given level based on the motion level deep feature of the $(t-1)^{th}$ frame of image and the motion level deep feature of the $t^{th}$ frame of image, to obtain the motion level information of the pixel points of the $(t-1)^{th}$ frame of image and the $t^{th}$ frame of image.

3. The method according to claim 2, wherein motion levels comprise a motion layer and a stationary layer.

4. The method according to claim 1, wherein the performing a frame interpolation operation layer by layer based on the deep frame interpolation features and the motion level information of the $(t-1)^{th}$ frame of image and the $t^{th}$ frame of image to generate an intermediate frame between the $(t-1)^{th}$ frame of image and the $t^{th}$ frame of image, and interpolating the intermediate frame between the $(t-1)^{th}$ frame of image and the $t^{th}$ frame of image comprises:

inputting the deep frame interpolation features and the motion level information of the $(t-1)^{th}$ frame of image and the $t^{th}$ frame of image into a pre-trained frame interpolation model, the frame interpolation model performing the frame interpolation operation layer by layer based on the motion level information, to obtain intermediate frames of layers; and combining the intermediate frames of the layers to obtain the intermediate frame between the $(t-1)^{th}$ frame of image and the $t^{th}$ frame of image, and interpolating the intermediate frame between the $(t-1)^{th}$ frame of image and the $t^{th}$ frame of image.

5. The method according to claim 4, wherein frame interpolation operations for layers are identical.

6. An electronic device, comprising:
at least one processor; and
a storage device, communicated with the at least one processor,
wherein the storage device stores instructions executable by the at least one processor, and the instructions are executed by the at least one processor, to enable the at least one processor to perform operations comprising:
acquiring a target video, and acquiring a $(t-1)^{th}$ frame of image and a $t^{th}$ frame of image in the target video, t being a positive integer;
acquiring motion level information of pixel points of the $(t-1)^{th}$ frame of image and the $t^{th}$ frame of image;
acquiring a deep frame interpolation feature of the $(t-1)^{th}$ frame of image and a deep frame interpolation feature of the $t^{th}$ frame of image, respectively; and
performing a frame interpolation operation layer by layer based on the deep frame interpolation features and the motion level information of the $(t-1)^{th}$ frame of image and the $t^{th}$ frame of image to generate an intermediate frame between the $(t-1)^{th}$ frame of image and the $t^{th}$ frame of image, and interpolating the intermediate frame between the $(t-1)^{th}$ frame of image and the $t^{th}$ frame of image, wherein the acquiring motion level information of pixel points of the $(t-1)^{th}$ frame of image and the $t^{th}$ frame of image comprises:
acquiring a motion level deep feature of the $(t-1)^{th}$ frame of image and a motion level deep feature of the $t^{th}$ frame of image, respectively; and
obtaining the motion level information of the pixel points of the $(t-1)^{th}$ frame of image and the $t^{th}$ frame of image based on the motion level deep feature of the $(t-1)^{th}$ frame of image and the motion level deep feature of the $t^{th}$ frame of image.

7. The electronic device according to claim 6, wherein the obtaining the motion level information of the pixel points of the $(t-1)^{th}$ frame of image and the $t^{th}$ frame of image based on the motion level deep feature of the $(t-1)^{th}$ frame of image and the motion level deep feature of the $t^{th}$ frame of image comprises:

marking pixels having identical motion attributes, objects having identical motion attributes or areas having identical motion attributes as a given level based on the motion level deep feature of the $(t-1)^{th}$ frame of image and the motion level deep feature of the $t^{th}$ frame of image, to obtain the motion level information of the pixel points of the $(t-1)^{th}$ frame of image and the $t^{th}$ frame of image.

8. The electronic device according to claim 7, wherein motion levels comprise a motion layer and a stationary layer.

9. The electronic device according to claim 6, wherein the performing a frame interpolation operation layer by layer based on the deep frame interpolation features and the motion level information of the $(t-1)^{th}$ frame of image and the $t^{th}$ frame of image to generate an intermediate frame between the $(t-1)^{th}$ frame of image and the $t^{th}$ frame of image, and interpolating the intermediate frame between the $(t-1)^{th}$ frame of image and the $t^{th}$ frame of image comprises:

inputting the deep frame interpolation features and the motion level information of the $(t-1)^{th}$ frame of image and the $t^{th}$ frame of image into a pre-trained frame interpolation model, the frame interpolation model performing the frame interpolation operation layer by layer based on the motion level information, to obtain intermediate frames of layers; and combining the intermediate frames of the layers to obtain the intermediate frame between the $(t-1)^{th}$ frame of image and the $t^{th}$ frame of image, and interpolating the intermediate frame between the $(t-1)^{th}$ frame of image and the $t^{th}$ frame of image.

10. The electronic device according to claim 9, wherein frame interpolation operations for layers are identical.

11. A non-transitory computer readable storage medium, storing computer instructions, wherein the computer instructions, when executed by a computer, cause the computer to perform operations comprising:
acquiring a target video, and acquiring a $(t-1)^{th}$ frame of image and a $t^{th}$ frame of image in the target video, t being a positive integer;
acquiring motion level information of pixel points of the $(t-1)^{th}$ frame of image and the $t^{th}$ frame of image;
acquiring a deep frame interpolation feature of the $(t-1)^{th}$ frame of image and a deep frame interpolation feature of the $t^{th}$ frame of image, respectively; and
performing a frame interpolation operation layer by layer based on the deep frame interpolation features and the motion level information of the $(t-1)^{th}$ frame of image and the $t^{th}$ frame of image to generate an intermediate frame between the $(t-1)^{th}$ frame of image and the $t^{th}$ frame of image, and interpolating the intermediate frame between the $(t-1)^{th}$ frame of image and the $t^{th}$ frame of image, wherein the acquiring motion level information of pixel points of the $(t-1)^{th}$ frame of image and the $t^{th}$ frame of image comprises:

acquiring a motion level deep feature of the $(t-1)^{th}$ frame of image and a motion level deep feature of the $t^{th}$ frame of image, respectively; and obtaining the motion level information of the pixel points of the $(t-1)^{th}$ frame of image and the $t^{th}$ frame of image based on the motion level deep feature of the $(t-1)^{th}$ frame of image and the motion level deep feature of the $t^{th}$ frame of image.

12. The storage medium according to claim 11, wherein the obtaining the motion level information of the pixel points of the $(t-1)^{th}$ frame of image and the $t^{th}$ frame of image based on the motion level deep feature of the $(t-1)^{th}$ frame of image and the motion level deep feature of the $t^{th}$ frame of image comprises:

marking pixels having identical motion attributes, objects having identical motion attributes or areas having identical motion attributes as a given level based on the motion level deep feature of the $(t-1)^{th}$ frame of image and the motion level deep feature of the $t^{th}$ frame of image, to obtain the motion level information of the pixel points of the $(t-1)^{th}$ frame of image and the $t^{th}$ frame of image.

13. The storage medium according to claim 12, wherein motion levels comprise a motion layer and a stationary layer.

14. The storage medium according to claim 11, wherein the performing a frame interpolation operation layer by layer based on the deep frame interpolation features and the motion level information of the $(t-1)^{th}$ frame of image and the $t^{th}$ frame of image to generate an intermediate frame between the $(t-1)^{th}$ frame of image and the $t^{th}$ frame of image, and interpolating the intermediate frame between the $(t-1)^{th}$ frame of image and the $t^{th}$ frame of image comprises:

inputting the deep frame interpolation features and the motion level information of the $(t-1)^{th}$ frame of image and the $t^{th}$ frame of image into a pre-trained frame interpolation model, the frame interpolation model performing the frame interpolation operation layer by layer based on the motion level information, to obtain intermediate frames of layers; and combining the intermediate frames of the layers to obtain the intermediate frame between the $(t-1)^{th}$ frame of image and the $t^{th}$ frame of image, and interpolating the intermediate frame between the $(t-1)^{th}$ frame of image and the $t^{th}$ frame of image.

15. The storage medium according to claim 14, wherein frame interpolation operations for layers are identical.

* * * * *

UNITED STATES PATENT AND TRADEMARK OFFICE
CERTIFICATE OF CORRECTION

PATENT NO. : 11,627,281 B2
APPLICATION NO. : 17/406965
DATED : April 11, 2023
INVENTOR(S) : Chao Li It is certified that error appears in the above-identified patent and that said Letters Patent is hereby corrected as shown below:

In the Claims

At Column 13, Line 9 (Claim 2), please delete "the $(t-1)^t$ frame of image" and insert --the $(t-1)^{th}$ frame of image-- therefor.

Signed and Sealed this
Eighth Day of August, 2023

Katherine Kelly Vidal
*Director of the United States Patent and Trademark Office*